May 8, 1934.　　　C. M. F. FRIDEN　　　1,957,496
CALCULATING MACHINE
Filed Nov. 25, 1929　　2 Sheets-Sheet 1
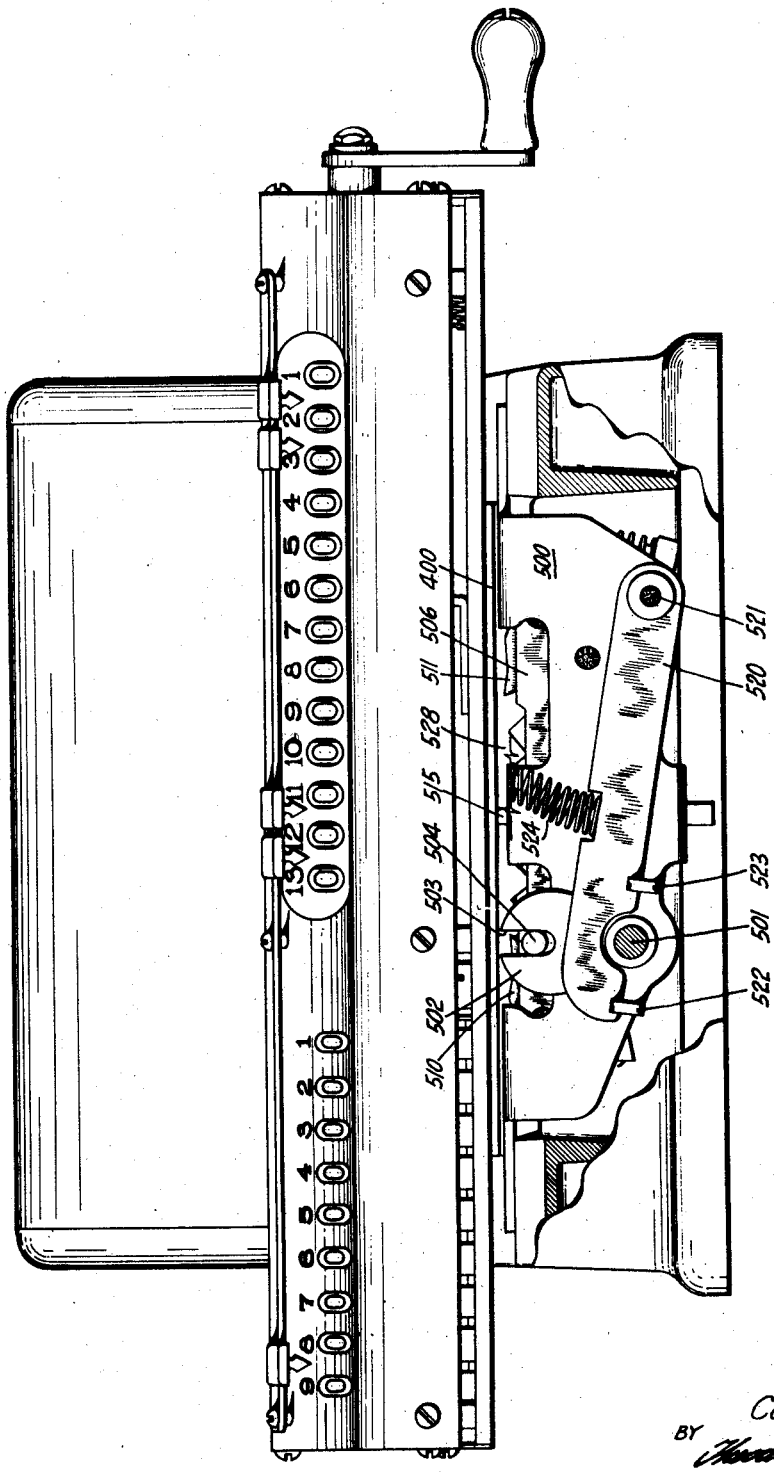
INVENTOR
Carl M. F. Friden
BY
ATTORNEY

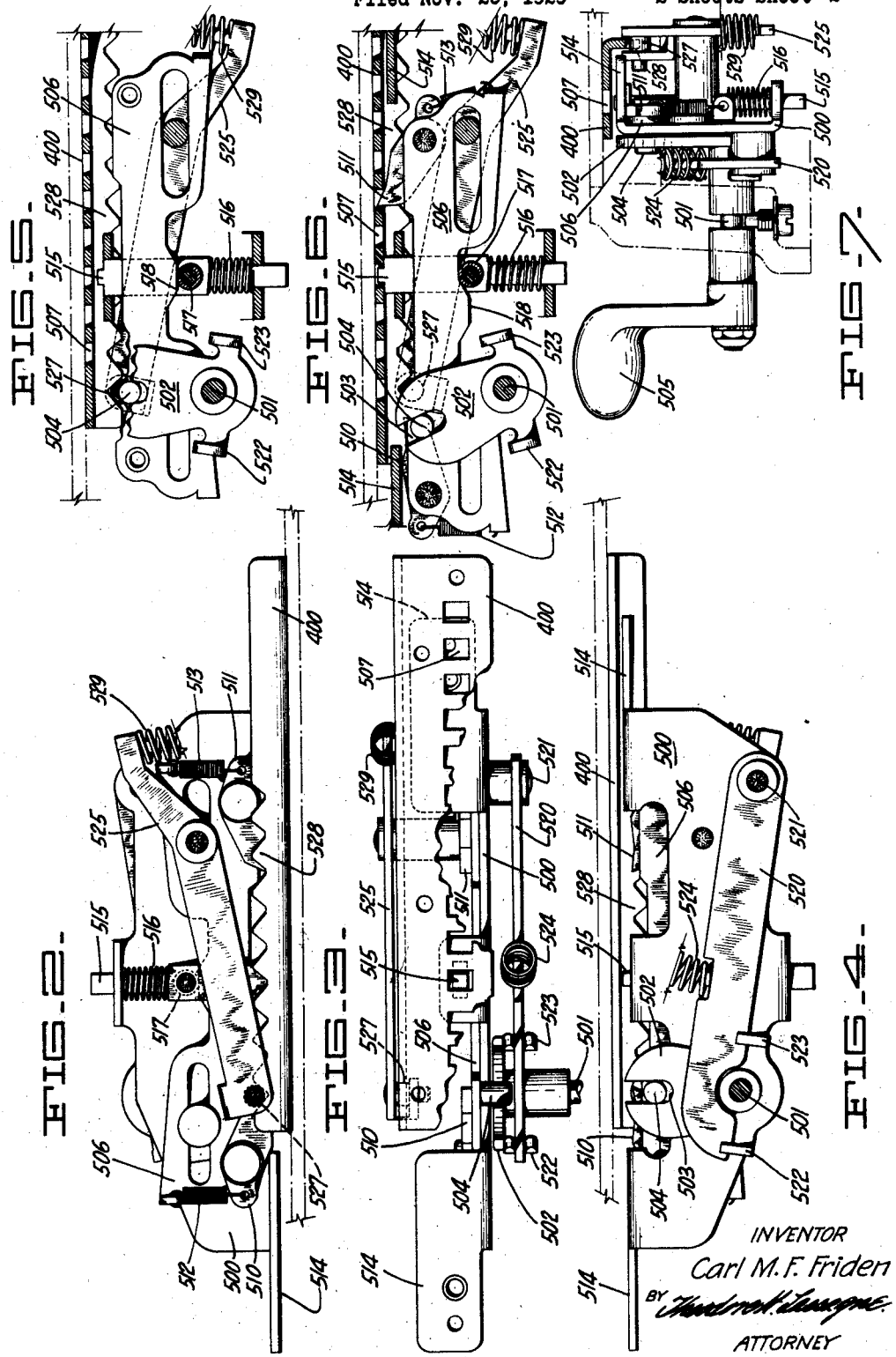

Patented May 8, 1934

1,957,496

UNITED STATES PATENT OFFICE 1,957,496

CALCULATING MACHINE

Carl M. F. Friden, Piedmont, Calif., assignor to Marchant Calculating Machine Company, Emeryville, Calif., a corporation of California Application November 25, 1929, Serial No. 409,641

7 Claims. (Cl. 235—63)

The present invention relates to calculating machines of the type in which a portion of the calculating mechanism is carried upon a shiftable carriage movable with respect to the remainder of the calculating mechanism in the performance of various calculations, and concerns particularly an improved mechanism for effecting displacement of such a carriage. In machines of this type it is desirable that the carriage be freely slidable upon its mounting, so that it may be properly positioned by hand at the commencement of the computation, without resorting to the step-by-step mechanism which is used for shifting it during computation. For this purpose it is not desirable to have the carriage locked in its position upon the carriage track, although it must be accurately aligned with respect to the remainder of the computing mechanism. It is also desirable to have a mechanism for shifting the carriage in either direction in a step-by-step movement during the performance of various calculations. Such mechanism to be practically useful must lock the carriage at the end of the single step of movement which it imparts, in order to prevent overthrowing due to the great momentum imparted to the carriage by high speed operation of such shifting mechanism. To meet the requirements of this situation the present invention provides a shifting means which first imparts movement to the carriage, then throws in a positive locking means to arrest this movement, and lastly withdraws the locking means when movement has ceased, leaving the carriage in condition for rapid traverse by hand in either direction. A resilient aligning means is provided which maintains the mechanism mounted in the carriage properly aligned with the balance of the mechanism.

An object of the invention is the provision of mechanism for positively preventing overthrow in step-by-step shifting, while permitting rapid traverse of the carriage.

Another object of the invention is the provision of an improved, simple and inexpensive carriage shifting mechanism for calculating machines.

Other objects will appear as the description progresses.

An example of a machine embodying the invention is described in the accompanying specification, and in the accompanying drawings forming a part thereof, in which:

Figure 1 is a front elevation of the machine with a portion of the casing broken away to disclose the mechanism.

Figure 2 is a rear elevation of the carriage shifting mechanism.

Figure 3 is a plan of the mechanism with a portion of the carriage base plate broken away to better disclose the parts.

Figure 4 is a front elevation of the mechanism.

Figures 5 and 6 are rear elevations with various parts broken away to better disclose the remaining parts.

Figure 7 is a side elevation of the assembled mechanism.

The carriage shifting mechanism proper is supported on the plate 500 mounted on the under side of the carriage track, and is controlled by the shift control shaft 501, which, on its rear end, carries the shift control plate 502 which is notched at 503 to receive a pin 504 on the shifting mechanism. The forward end of shaft 501 carries a handle 505 adapted to be manually rocked in either direction from its normal vertical position to shift the carriage in the direction of the rocking. The pin 504 engaged by the notched shift control plate is carried on a slide member 506, provided with slots embracing studs on the supporting plate 500.

Pivotally mounted adjacent the ends of the slide 506 are shifting pawls 510, 511. The noses of these pawls are urged toward the base plate of the carriage 400 by springs 512 and 513 tensioned between the tails of the pawls and the slide 506, but, in the normal position of the slide, flanges 514 formed on plate 500 overlie the pawls and prevent their rising to engagement with plate 400. As the slide 504 is moved in either direction from its center position by the operation of the handle 505, one of the pawls 510 or 511 will be moved out from under its flange 514, and under the urge of its spring will engage one of the apertures 507 in the carriage base plate 400. As the slide 506 continues to move, then, the carriage will be moved one step in the direction of motion of the slide.

Means are provided for positively arresting movement of the carriage at the end of a single step of movement. A locking dog 515 is mounted for sliding vertical movement between two flanges formed on the plate 500, and is normally urged into position to engage one of the apertures 507 by a spring 516 compressed between one of the flanges and an abutment formed on the locking dog. In the normal position of the slide 506, however, a roller 517 mounted on the dog 515 engages a high cam edge 518 of the slide 506 and prevents the dog from rising into position to engage the aperture 507. The carriage is thus freely shiftable by hand to any of its positions when the step-by-step shifting mechanism is in its normal position.

As the slide 506 moves away from its central position in a shifting operation, however, the roller 517 rides off the high cam edge 518, permitting dog 515 to rise under the urge of its spring 516 and to engage one of the apertures 507 at the end of a single step of carriage movement, thus positively preventing further movement of the carriage. As the slide 506 returns to its central position after a shifting operation, the operative shifting pawl is returned to its nonengaging position by its flange 514, and the locking dog 515 is returned to inoperative position by the re-engagement of its roller 517 with the high cam edge 518, leaving the carriage in condition for free manual shifting.

Means are provided for accurately centering the step-by-step shifting mechanism when it is not in use, comprising a lever 520 pivoted at 521 on the plate 500. The end of the lever remote from its pivot engages ears 522 and 523 formed on the shift control plate 502, and a spring 524 compressed between an intermediate portion of the lever and a portion of the frame, urges the lever into its lowermost position, aligning the two ears with the pivot point of the lever and centering the shifting mechanism.

Means are provided for accurately aligning the carriage with the balance of the computing mechanism after a shifting or traversing operation, comprising a lever 525 pivoted on plate 500 and carrying at one end a roller 527. The carriage base plate 400 is provided with a toothed flange 528 cooperating with this roller, and the roller is spring-pressed into engagement therewith by a spring 529 compressed between the opposite arm of the lever 525 and a fixed portion of the frame. At the conclusion of a shifting or traversing operation, then, the roller 527 is pressed between the nearest pair of teeth on flange 528, and serves to accurately align the carriage in its proper position.

While the preferred construction has been described in the foregoing specification, it is understood that the invention is capable of modification within the scope of the following claims.

I claim:

1. In a calculating machine having a frame and a normally free shiftable carriage thereon, carriage shifting mechanism comprising means on said machine frame for imparting movement to said carriage, means for arresting said movement, and common means for restoring both said means to inoperative position.

2. In a carriage shifting mechanism, carriage locking mechanism, reversibly reciprocable carriage shifting mechanism, and means for concurrently centering said shifting mechanism and disabling said locking mechanism.

3. In a carriage shifting mechanism, a reciprocable slide, shifting pawls carried thereby, carriage locking mechanism, and a cam in fixed relation with said slide for controlling said locking mechanism.

4. In a calculating machine, a normally free shiftable carriage, carriage shifting mechanism, carriage delimiting means operable to engage said carriage and rendered inoperative by said mechanism in its normal position, and resilient means for aligning said carriage in full-step positions.

5. In a calculating machine, a frame, a laterally shiftable carriage mounted thereon, a laterally movable member carrying means for connecting said carriage and said frame to effect shifting of said carriage in either direction, vertically movable means connecting said carriage and said frame to effect locking of said carriage, and means controlled by said laterally movable member when in its central position for rendering said vertically movable means ineffective to lock said carriage.

6. In a calculating machine, a frame, a laterally shiftable carriage mounted thereon, a laterally movable member carrying means for connecting said carriage and said frame to effect shifting of said carriage in either direction, vertically movable means connecting said carriage and said frame to effect locking of said carriage, and resilient means for moving said laterally movable member to ineffective position and rendering said vertically movable means ineffective to lock said carriage.

7. In a calculating machine, a frame, a laterally shiftable carriage mounted thereon, a laterally movable member carrying means for connecting said carriage and said frame to effect shifting of said carriage in either direction, vertically movable means connecting said carriage and said frame to effect locking of said carriage, and resilient means for positioning said laterally movable member centrally with respect to its range of excursion and concurrently rendering said vertically movable means ineffective to lock said carriage.

CARL M. F. FRIDEN.